June 13, 1939.  W. H. SPIRE  2,162,133
HYDRAULIC FORCE-MULTIPLYING MACHINE
Filed March 19, 1936   2 Sheets-Sheet 2
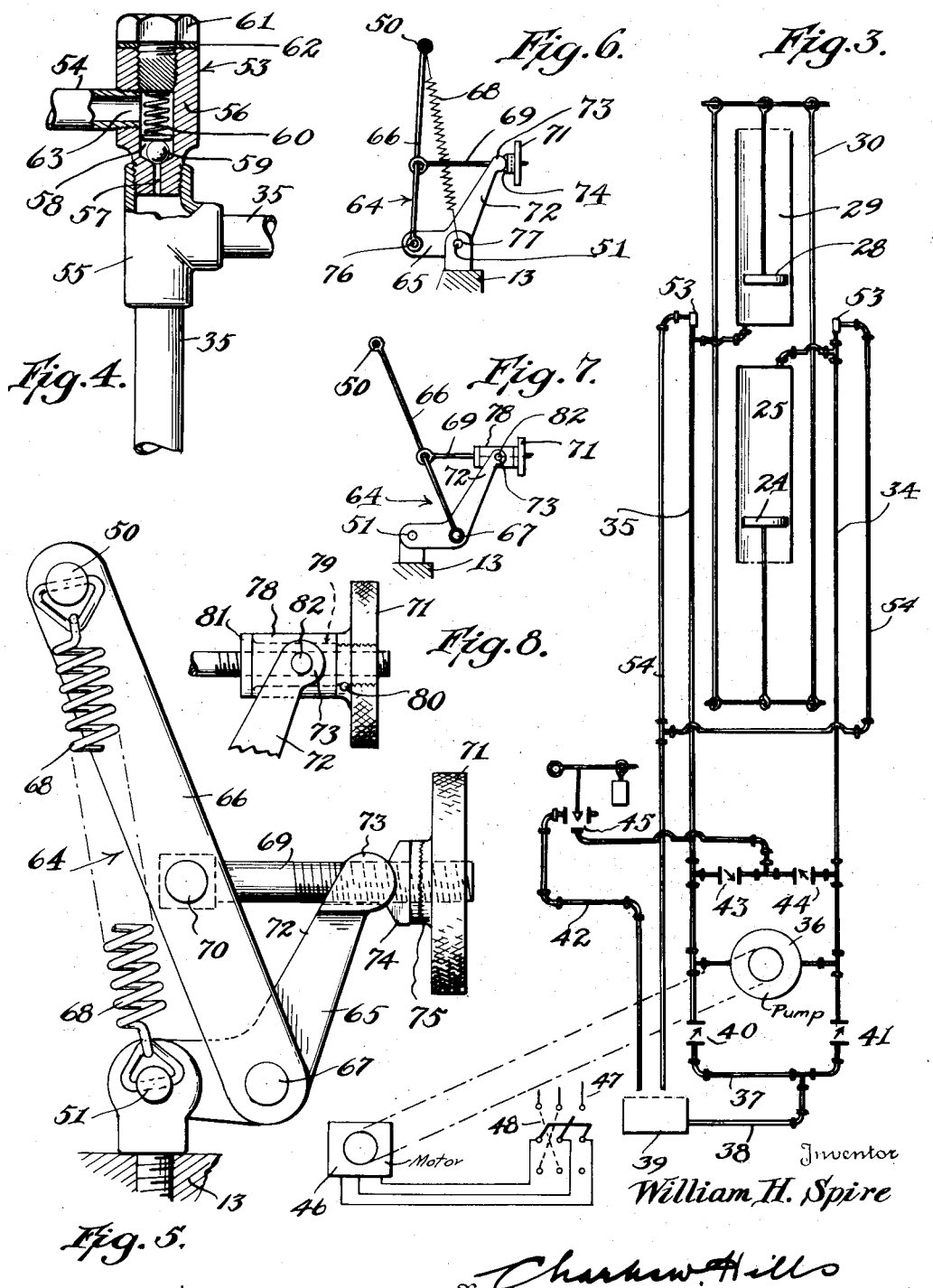
Inventor
William H. Spire
By Charles W. Hills
Attorney Patented June 13, 1939

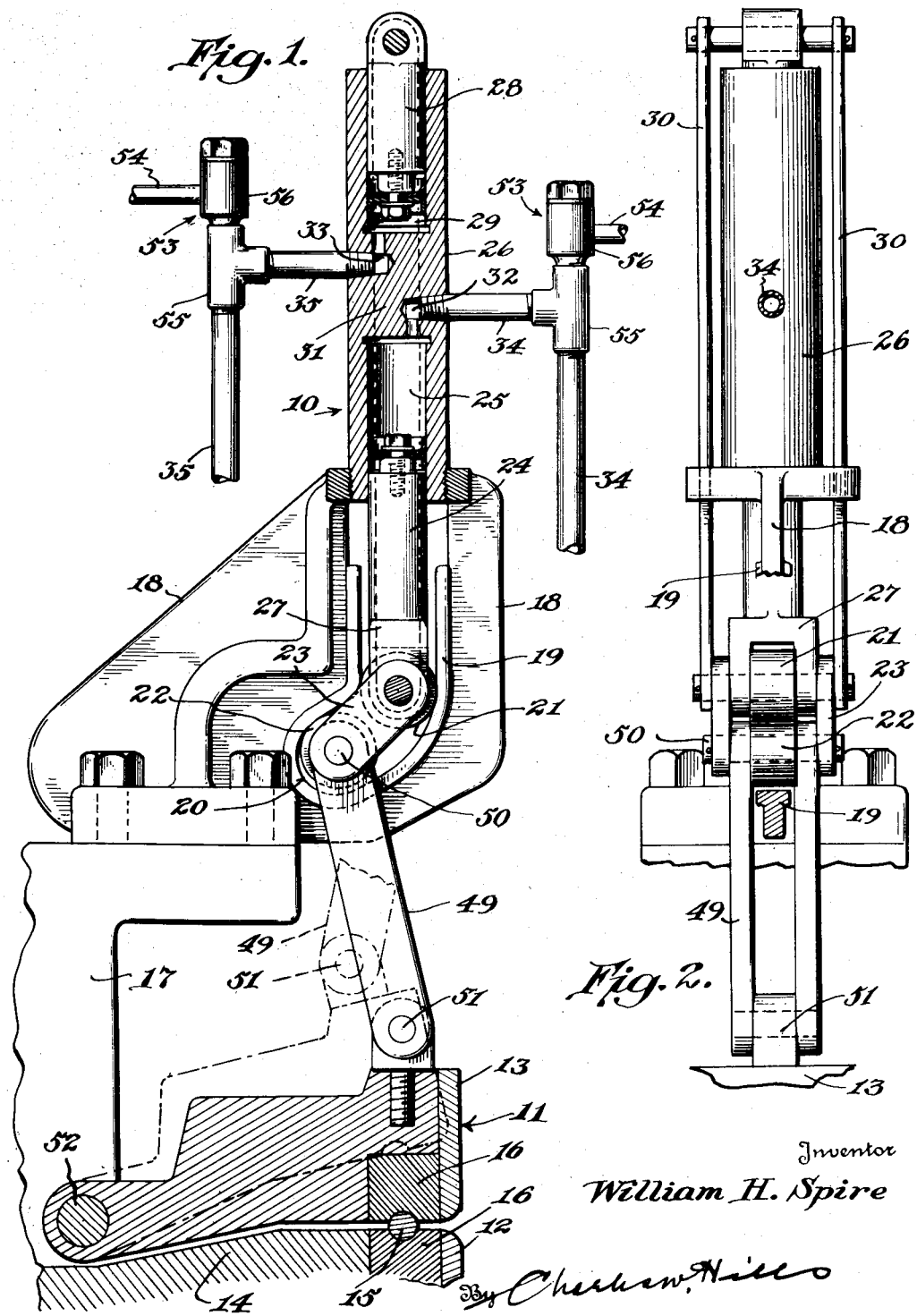

2,162,133

UNITED STATES PATENT OFFICE 2,162,133

HYDRAULIC FORCE-MULTIPLYING MACHINE

William H. Spire, Cleveland, Ohio, assignor to Thompson Products, Incorporated, Cleveland, Ohio, a corporation of Ohio Application March 19, 1936, Serial No. 69,745

3 Claims. (Cl. 81—17)

This application is a continuation in part of my application, Serial No. 678,531, filed on June 30, 1933, entitled Electrical metal gathering machine, and which issued on April 14, 1936, as Patent No. 2,037,604.

This application relates particularly to a hydraulic force-multiplying machine adapted for use as an operator of a clamp, and available for use as an operator of machines in which holding or shaping elements are moved far apart to permit the insertion or removal of the work piece, and in which the greatest pressure is applied to the holding or shaping elements as they come together for the holding or shaping operation. The application of the hydraulic force-multiplying machine is contemplated in connection with jig clamps, vises, chucks, shears, presses for molding plastics, and the like.

It is an object of this invention to provide a hydraulic force-multiplying machine having a reciprocable member for connection to a movable holding or shaping element, and arranged to move the reciprocable member at a high speed to bring the element quickly towards the thing to be held or shaped, and to exert great pressure on the element at the end of the working stroke and when the element is now functioning to hold or shape the work piece.

It is an important object of this invention to provide a hydraulic force-multiplying machine having a reciprocable member for connection to a moving work element and arranged to produce a variable pressure on the work element while the hydraulic pressure remains substantially constant and, therefore, to produce the variable pressure on the work element without resorting to the use of a hydraulic system having dual pressures and flow capacities.

It is an object of this invention to provide a hydraulic force producing machine having a reciprocable member for connection to a movable work element and so arranged that the direction of movement of the reciprocable member can be reversed by simple switch means.

It is an object of this invention to provide a machine having a reciprocable member with means carried by the member for quickly adjusting the effective length of the reciprocable member.

It is an object of this invention to provide means carried by a reciprocable member for the ready adjustment of the effective length of the member.

It is an object of this invention to provide a hydraulic force producing machine for connection to a hydraulic system, and provided with means to vent air and gases from the system.

Other and further objects of this invention will appear hereinafter from the disclosure in the drawings and specification.

The invention, in a preferred form, is illustrated in the drawings and hereinafter more fully described.

In the drawings:

Figure 1 is a side elevational view of a hydraulic force-multiplying machine, with parts in plan, parts in section, and parts broken.

Figure 2 is a front elevational view of the machine, with parts in plan, parts in section, and parts broken.

Figure 3 is a diagrammatic showing of a fluid pressure system in connection with the machine.

Figure 4 is a detail view of an air-venting device with parts in plan and parts in section.

Figure 5 is a side elevational view of link adjusting means for the machine of Figure 1, with parts in section, parts in plan and parts broken.

Figures 6 and 7 are diagrammatic showings of modifications in the connection of the components of the means of Figure 5.

Figure 8 is a detail view of a part of the means of Figure 7, with parts in plan and parts broken.

In Figure 1 there is shown a hydraulic clamp actuating device indicated generally by the numerals 10. While this device was described as means for actuating the jaws of a clamp electrode in my copending application Serial No. 678,531, filed on June 30, 1933, in connection with the operation of a metal gathering machine it will be obvious that it is capable of use in other use associations. It will be described herein in connection with a clamp for purposes of illustration and not by way of limitation as to use.

In the copending application, just referred to, the device appears as the operator of a clamp in which the jaws are capable of being widely separated to permit the ready insertion or removal of the thing clamped, and the opening and closing of the jaws of the clamp are quickly effected by a simple manipulation of a switch.

The device also appears as a hydraulic operator to produce relative movement of the jaws of a clamp and arranged to apply great pressure during a very small part of the total pressure-applying stroke, and at the end of the stroke.

A clamp 11 is connected to the clamp actuating device 10, and the clamp comprises a stationary lower jaw 12 and a hinged upper jaw 13, both of which are suitably mounted on a frame 14.

The clamp 11 is adapted to clamp a rod or an article, indicated generally by the numerals 15, between the jaws thereof, and the jaws are provided with removable inserts 16 having a working face of a desired shape and material to engage the rod 15.

The clamp actuating device 10 is suitably mounted on and secured to a standard 17 which is fastened to the frame 14, and it comprises a frame 18 having a runway defined by a curved guide rail 19 which provides spaced opposed vertical components and continuing lower inclined and spaced components terminating in a curved toe 20.

A pair of rollers 21 and 22 slide guided between the opposed faces of the rail 19, and the rollers are held for rotation in assembled relation by a pair of connecting side links 23.

The rollers are adapted to be pushed downwardly by a piston 24 in a bore 25 of a cylindrical structure 26 by a link or yoke 27 connecting the piston with the rollers, and they are adapted to be moved upwardly by a piston 28 in an upper bore 29 of the cylindrical structure 26 through side links 30 pivotally connected to the upper piston and to the lower piston.

There is a solid portion 31 between the upper and lower bores of the structure 26, and this solid portion is provided with passages 32 and 33 communicating with the lower and upper bores, respectively, and connected to pipes 34 and 35, respectively, which are threaded in the solid portion.

The pipes 34 and 35 are connected to a gear type of pump 36, and in the operation of the pump, as described hereinafter, each of the pipes becomes alternately a suction and a discharge line of the pump.

A pipe loop 37 is connected to the pipes 34 and 35, and a pipe 38 connects the loop with an open oil reservoir 39. In the pipe loop 37 there is interposed a pair of check valves 40 and 41 to prevent flow of oil towards the reservoir 39. A relief pipe 42 is connected to the pipes 34 and 35 to discharge oil to the reservoir, and between its connection with these pipes there are interposed check valves 43 and 44 to prevent the discharge of the pump from passing from the discharge line to the suction line. In the relief pipe 42 there is interposed a weighted relief valve 45. The suction side of the pump is always in communication with the open reservoir 39 to replenish the pressure part of the system in the event of loss of oil through leakage.

The pump 36 may be driven by a motor 46 connected to power lines 47 through a reversing switch 48. In the copending application already referred to the pump is described as connected through gears to a pusher motor adapted to push a rod against an anvil so that the direction of rotation of the pusher motor determines the activity of the pistons 24 and 28 of the hydraulic device 10, and reversal of rotation of the pusher motor is effected by a reversing switch.

When the pump 36 is rotated in one direction it sucks oil through the pipe 35 and discharges through the pipe 34 so that the piston 24 is pushed down and the piston 28 is pulled down.

The diameter of each of the pistons is relatively small in comparison with the capacity of the pump so that it requires but a few revolutions of the pump to make the pistons traverse their full stroke, and the opening and closing of the jaws of the clamp is quickly effected. In a working installation the pump is driven by a ¼ H. P. motor at a speed of 1750 R. P. M., and is capable of handling about one third of a gallon of oil per minute against a pressure of 300 lbs. per square inch. The inertia of a motor of this size is low and it may be quickly reversed, and the motor, therefore, may be readily connected to a switch actuated by a moving part of a machine to effect reversal of oil flow in the hydraulic system after the manner indicated in my copending application.

A pair of links, or pitmen, 49 are pivotally connected at their upper end to the lower end of the link 23, as at 50, and are also pivotally connected at their lower end, as at 51, to the end of the lever or clamp jaw 13 at a point above and remote from where the jaw 13 is hinged to the frame 14, as at 52.

While the piston 24 is substantially housed in the bore 25 the links 23 are in vertical alignment with the longitudinal axis of the piston, and, as indicated in the hatched showing, the point 51 has moved to the left and the rod 49 is inclined to the left at its lower end.

As the piston 24 descends the links 23 are swung to the left as the rollers 21 and 22 follow the path provided by the guide rail 19. As the lower roller 22 is forced along the curved path towards the toe 20 of the path provided by the guide rail 19 the links 49 are pushed downwardly, and their lower end swings to the right. There is thus a force-multiplying effect as the lower roller goes down the inclined portion.

It will now be clear that a high clamping pressure is obtained at the end of the stroke without necessitating the manipulation of valves and without necessitating the employment of a dual pressure hydraulic system, in other words, without necessitating a change-over from a low pressure high capacity to a high pressure low capacity hydraulic system with the attendant change-over valves and valve operating mechanism.

The speed of clamping is high, and the required high clamping pressure is available at the end of the closing stroke.

If the rod 15 is pushed through the clamp, as in a metal gathering operation, such as that described in my copending application, small changes in the diameter of the rod are compensated for because the pistons are forced to move up or down against the pressure in the cylinder while the clamping pressure remains substantially constant at its maximum value. When some tolerance is permitted in the diameter of the rod the rods are cheaper than if the efficient operation of the machine called for rods of uniform diameter along their length and all carefully matched by precision gauges.

The connection between the pistons and the clamp may be said to be "lively", that is, it may immediately accommodate itself to small changes in the diameter of the rod without changing the effectiveness of the clamp.

When rotation of the pump 36 is reversed by the reversing switch 48 oil is sucked from the bore 25 and forced into the bore 29 to cause upward movement of the pistons and the opening of the clamp.

Means are provided to release air or gases that find entrance to the cylinders 25 and 29 and tend to cushion the pistons 24 and 28, and such means comprise air-venting devices, indicated generally by the numerals 53, which are connected in the pipe lines 34 and 35, respectively, to vent air and oil by vent pipes 54 to the open oil reservoir 39.

The air-venting devices 53 each comprise a T-fitting 55 into which a plug body 56 is threaded at the upper end of the T. The plug body is provided with a small metering bore 57 opening into the T and forming an extension of an enlarged bore 58 in the plug body. A ball 59 in the plug body normally closes the bore 57 under the pressure of a spring 60 which is compressed by the entering of a threaded plug 61 in the plug body. A gasket 62 is placed between the head of the plug 61 and the plug body to make an oil tight seal. The plug body 56 is also provided with a side bore 63 in communication with the bore 58 and with the vent pipe 54.

When one or the other of the pipes 34 and 35 is carrying oil under pressure some of this oil will be forced through the bore 57 and return to the reservoir 39 by the vent pipe 54. If air is present in the feed pipe it will naturally find its way to the top of the T-fitting and be vented with the oil passing out to the vent pipe 54.

When the pipes 34 or 35 are suction lines it will be obvious that the spring 60 will force the ball 59 to close the bore 57, and that there is no suction on the vent pipe 54.

The oil passing through the metering bore 57 is insignificant in volume compared with that being pumped through the feed lines 34 and 35, and since the pump 36 is in communication with the open reservoir 39 there is no possibility of depleting the system.

The vent devices 56 are eminently simple in construction, and are preferred to traps in an installation of the kind described.

When the clamp 11 is an electrode in a metal gathering machine the inserts 16 are usually of copper, and, of course, are subject to wear when the steel rod 15 is pushed through the clamp. As the inserts become worn the roller 22 moves farther to the left and will ultimately abut the toe 20 of the path defined by the guide rail 19. Unless a very definite locking effect is desired the device is operated with the lower roller 22 near to, but not in contact with, the abutment provided by the toe 20 when the clamp is closed.

It has heretofore been necessary to place shims behind the inserts 16 to compensate for wear. New inserts were not always machined so accurately as to make them truly interchangeable and shims had to be employed.

To eliminate shims, and the skilled labor necessary in placing and adjusting them, means were devised so that wear of the inserts 16 could be quickly compensated for by the operator of the metal gathering machine without his having to put the machine out of production for the time-consuming and tedious job of fitting shims.

Wear-compensating means, indicated generally by the numerals 64, are connected between the pivotal connections 50 and 51 shown in Figure 1. A crank 65 is pivotally connected to the clamp jaw 13 at 51, and a link 66 is pivotally connected to the crank at 67 and to the link 23 at the point 50. A coiled spring 68 extends between the points 50 and 51 and is connected to the link 23 and to the jaw 13, respectively, at these points. A rod 69 is pivotally connected to the link 66 as at 70 and the free end of the rod is threaded and is provided with a threaded nut 71 thereon. The inclined and free arm 72 of the crank 65 is provided with a bifurcated and curved end portion 73 which seats in a curved recess of a bearing block 74 slidably mounted on the rod 69, and the block is forced against the nut 71 by the free end 73 of the crank 65. The rear face of the bearing block 74 and the forward face of the nut 71 is each provided with teeth or corrugations 75 to prevent the accidental turning of the nut 71.

The spring 68 is of such a length that it exerts a pull at all times to take up back lash and to hold the curved end 73 of the crank against the bearing block 74. When the distance between the points 50 and 51 of Figure 1 should be increased to compensate for wear of the inserts 16, the nut 71 is turned to force the arm 72 of the crank 65 towards the left, and the crank 65, revolving about the point 67, forces the point 51 down against the pull of the spring 68.

To decrease the distance between the points 50 and 51 of Figure 1, as when a new insert 16 has been fitted in the jaw 13, the nut 71 is turned to move the arm 72 of the crank towards the right under the influence of the spring 68.

For the type of service already indicated, that of adjusting the length of the link between the points 50 and 51 of a clamp electrode, the link system is devised to be in compression under heavy pressure and to be in tension only for such loads or pressures as are well within the capacity of the spring 68. Should it be desired to accommodate the link adjusting system for conditions in which the load is light in compressing and heavy in lifting, the link 66 is pivotally connected at its lower end to the crank 65 as at 76, Figure 6, and the lower end of the spring 68 and the jaw 13 are connected to the crank as at 77 (pivot point 51).

Should it be desired to accommodate the link adjusting system to conditions in which the load is equal in compression and intension, the link 66 is connected to the crank as at 67 in Figure 5, but the spring 68 is removed, and the arm 72 is now pivotally connected to a bearing block 78 which is connected to the nut 71 for movement therewith, as is shown in Figure 7. The nut 71 is provided with an extension in the form of a sleeve 79 which is threaded into the nut at one end and locked thereto by a pin 80 entered in aligned side bores in the nut and sleeve. The sleeve 79 is provided at its other end with an upstanding flange 81. The bearing block 78 is mounted revolvable on the sleeve, and it is provided with a pair of outstanding lugs 82 which are entered in apertures in the end of the arm 72. It will be evident that when the nut and its sleeve are turned on the rod 69 the arm 72 will move in synchronism with the nut.

While the link adjusting means 64 have been described in connection with a clamp, it will be obvious that such means are capable of use in other use associations.

While the hydraulic device, indicated generally by the numerals 10, was also described herein in connection with a clamp, it will be obvious that it is adaptable to other use associations, as in the operating of jig clamps, vises, shears, presses for molding plastics, and similar holding and material forming machines.

I am aware that many changes may be made and numerous details of construction may be varied through a wide range without departing from the principles of the invention, and I, therefore, do not purpose limting the patent granted hereon otherwise than necessitated by the prior art.

What is claimed is:
1. In a hydraulic machine which includes an elongated cylinder and a piston reciprocable in said cylinder, a source of constant fluid pressure to operate said piston, a support, a jaw hinged at one end to said support, an anvil in opposed relation to said jaw, a link pivotally connected at one end to the free end of said jaw and pivotally connected at its other end with said piston, means cooperable with said link and said piston to produce an increase in the pressure applied to said jaw in its direction of movement towards said anvil while the fluid pressure is maintained substantially constant, said means comprising a curved guideway defining a path inclined downwardly towards the hinged end of said jaw and terminating in a toe, the other end of said link being arranged to be moved towards said toe by said piston to move said jaw towards said anvil while said piston moves in a direction substantially normal to said anvil.

2. A clamp comprising a support, a jaw hinged at one end to said support, an anvil, means forming a curved guideway defining a path inclined downwardly towards the hinged end of said jaw and terminating in a toe, a link pivotally connected at one end to the free end of said jaw and having its other end movable along said curved guideway, and means to compel movement of the other end of said link towards said toe to close said clamp.

3. A clamp comprising a support, an elongated jaw having a hinged connection at one end to said support, a link pivotally connected at one end to the free end of said jaw and in laterally offset relation to said hinged connection, an anvil in opposed relation to said jaw, means forming a curved guideway defining a path inclined downwardly towards the hinged end of said jaw, the other end of said link being connected to a roller movable along said guideway, and means to compel movement of said roller along said guideway to cause closing of said clamp.

WILLIAM H. SPIRE.